Feb. 21, 1928. 1,660,091
F. PORSCHE
APPARATUS FOR BRAKING MOTOR VEHICLES
Filed Nov. 6, 1922 2 Sheets-Sheet 1
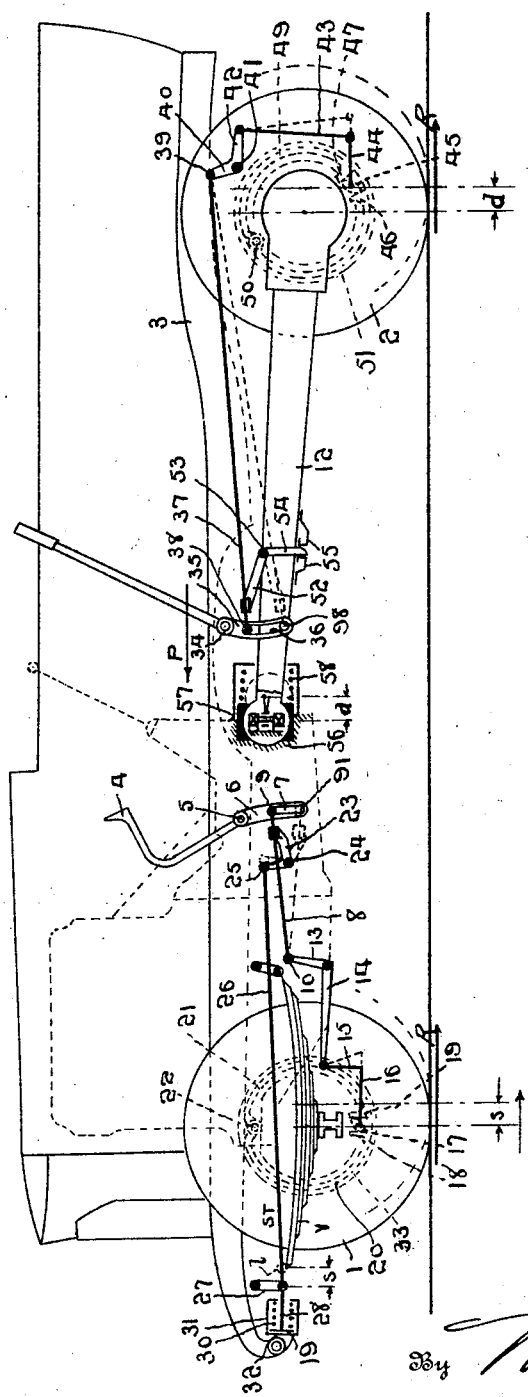
Inventor
F. Porsche,
By Marts Clerk
Attorneys Feb. 21, 1928.
F. PORSCHE
1,660,091
APPARATUS FOR BRAKING MOTOR VEHICLES
Filed Nov. 6, 1922   2 Sheets-Sheet 2
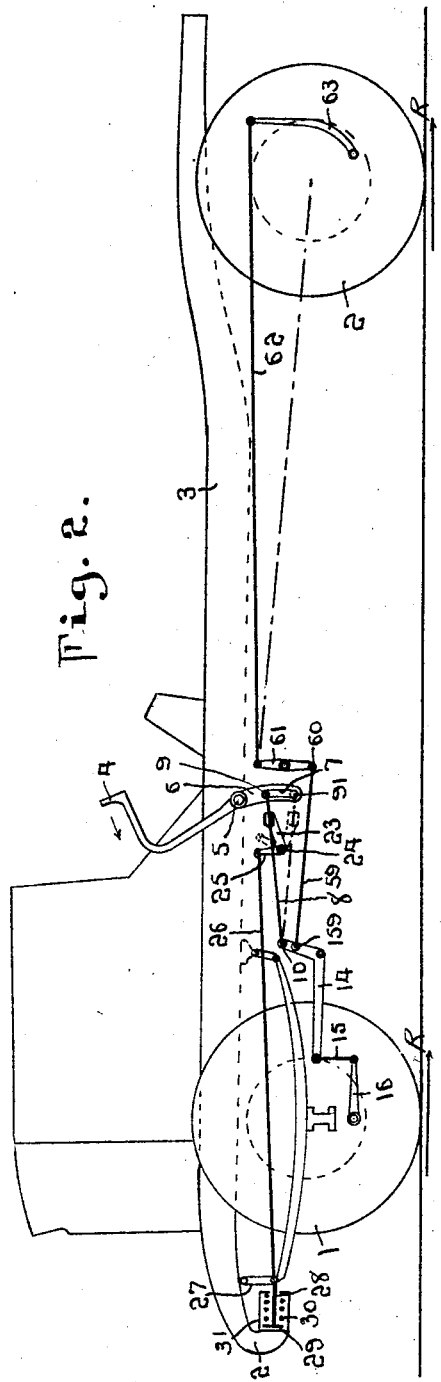
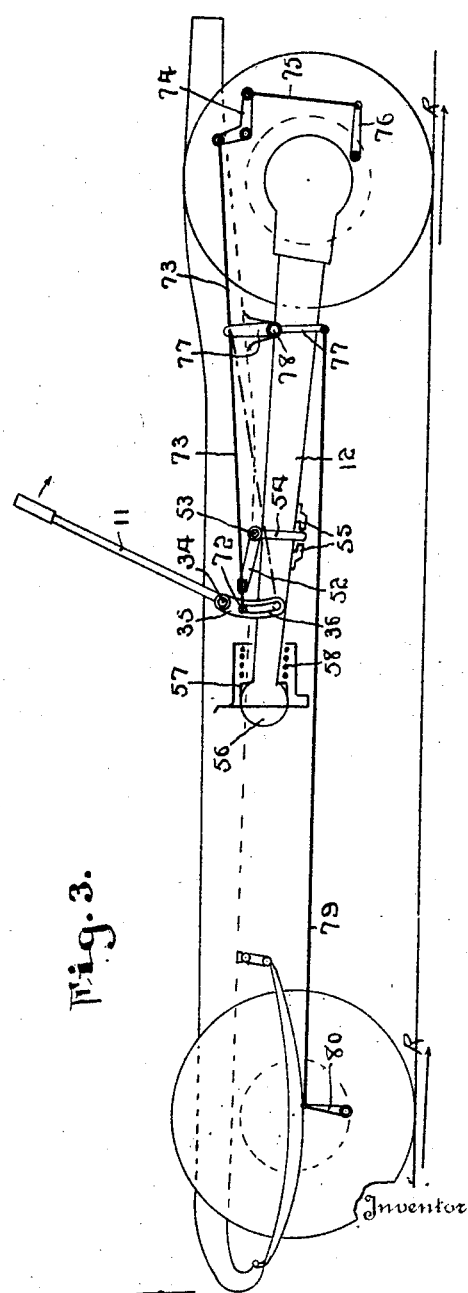
Inventor
F. Porsche
By Marks & Clerk Attorneys Patented Feb. 21, 1928.

1,660,091

UNITED STATES PATENT OFFICE.

FERDINAND PORSCHE, OF WIENER-NEUSTADT, AUSTRIA, ASSIGNOR TO DAIMLER-BENZ AKTIENGESELLSCHAFT, OF BERLIN, GERMANY.

APPARATUS FOR BRAKING MOTOR VEHICLES.

Application filed November 6, 1922, Serial No. 599,429, and in Austria November 26, 1921.

The brakes which have hitherto been employed for braking the road wheels of power driven vehicles have the undesirable property that when the pedal or hand lever is actuated to apply the brake blocks to the brake drums it is not always possible to avoid locking of the wheels, no matter how carefully the driver applies the brakes.

As is well known however, the moment the road wheels become locked the braking action ceases altogether and the vehicle then slides along the track.

The present invention has for its object to overcome this very important drawback and with this object in view the invention consists in the provision of means for automatically limiting the braking pressure so as to prevent the road wheels from becoming locked.

The main feature of the invention consists in connecting the braked portions of the vehicle (axles and road wheels) and the non-braked portions of the vehicle (frame and parts mounted thereon) by means which permit of displacement of the braked portions relatively to the non-braked portions, so that the relative movement which takes place in consequence of the braking of the road wheels will at all times reduce the leverage of the brake rigging automatically shortly before locking of the wheels takes place, thereby reducing the braking pressure.

Another feature of the invention consists in interposing at the point where the braked and non-braked portions of the vehicle are connected together a member which is capable of being adjusted to answer to the nature of the roads over which the vehicle has to travel, said member opposing a yielding resistance to the relative displacement of the portions of the vehicle.

In order that the invention may be understood, three constructional forms are illustrated by way of example in the accompanying drawings as applied to vehicles having both front and rear wheel brakes.

In the drawings:

Fig. 1 is a diagrammatic side elevation of an automobile in which the front wheel brakes are operated by means of a pedal and the rear wheel brakes by means of a hand lever, Fig. 2 is a similar view of an automobile in which both the front and rear wheel brakes are operated by means of a pedal, and Fig. 3 is a similar view of an automobile having the front and rear wheel brakes operated by means of a hand lever.

Referring to Fig. 1, 3 is the frame of the vehicle, 1 the front road wheels and 2 the rear road wheels. The front wheel brakes are operated by means of a pedal 4 which is rotatably mounted on a cross shaft 5, the pedal 4 being prolonged beyond the cross shaft 5 to form a lever 6 provided with a slot 7 in which engages a pin 9 provided on the rod 8. The end 10 of the rod 8 is connected up with the brake cam 17 by means of link work 13, 14, 15, 16. The brake cam 17 is situated between the free ends 18 and 19 of the brake shoes 20 and 21 which are pivoted on a pivot pin 22. The rod 8 is engaged by one arm 23 of an angle lever pivoted on a stud 24, the other arm 25 of the angle lever being connected up to a pull rod 26 which in the example shown is attached to the spring shackle 27. A short rod 28 provided with a spring plate 29 is also connected up to the spring shackle 27. A spring 30 housed in a spring casing 31 into which the rod 28 passes bears at one end against the spring plate 29 and at its other end against the end of the spring casing 31 which is attached to the dumb iron 32 of the vehicle.

For applying the brake shoes 20 and 21 to the brake drum 33, the pedal 4 is depressed in the direction of the arrow, thereby causing the lever 6 to swing rearwardly. The movement of the lever 6 is transmitted by means of the link work 13, 14, 15, 16 to the brake cam 7 which is rocked, and expands the brake shoes and applies them to the brake drum.

In the ordinary brake systems locking of the wheels occurs when the braking moment produced by the pressure with which the brake shoes are applied to the brake drum and the adhesion moment of the wheel (weight multiplied by the friction coefficient between the tire and track and multiplied by the radius of the wheel) are equal. According to the invention the braking moment is prevented from reaching the magnitude of the adhesion moment. For this purpose the strength of the spring 30 is so adjusted that it will yield shortly before the ground resistance of the braked road wheels approaches the magnitude corresponding to the adhesion moment. The ground resistance which acts to produce the pull and is indicated in the drawing by R tends to displace the braked portions of the vehicle relatively to the non-braked portions of the vehicle rearwardly by an amount, by way of example indicated as S. By this means the rod 26 is also displaced and rocks the angle lever 23 about the pivot 24 so that the arms of the angle lever are moved from the position shown in full lines to the position shown in broken lines, whereby the pin 9 of the rod 8 is moved to the position 91 whereby the leverage of the pedal 4 is reduced. In consequence the braking pressure which is exerted upon the brake cam 17 and the brake shoes 20, 21 is reduced, the braking moment thereby being less than the adhesion moment, so that locking of the wheels cannot take place. The driver is therefore able to apply the brakes fully at any speed and cause the highest possible braking pressure to act on the brake shoes without locking of the wheels taking place at any time. Instead of the springs 30 any suitable device can be employed which has similar properties and the parts just described may be arranged and constructed in any suitable manner to correspond to the design of the vehicle.

The rear wheel brakes are applied by means of a hand lever 11 which is rotatably mounted on the shaft 34, said lever 11 being extended beyond the shaft 34 to form an arm 35 which is provided with a slot 36 in which engages one end 38 of the rod 37. The other end 39 of the rod 37 is connected up to one arm 40 of an angle lever which is capable of rocking about a fulcrum 41. The other arm 42 of this angle lever is permanently connected up to the brake cam 45 by means of links 43, 44. The brake cam 45 engages between the free ends 46, 47 of the brake blocks 48 and 49 which are pivoted on a pivot pin 50 and are located inside a brake drum 51. The rod 37 is further engaged by one arm 52 of an angle lever which is fulcrumed on a pivot 53, the other arm 54 of said angle lever engaging between two stops 55 on the Cardan shaft casing 12. The ball socket 56 of the Cardan shaft casing universal joint is carried in a sliding bearing 57 which bears rearwardly against a spring 58.

When the hand lever 11 is pulled over in the direction of the arrow, the brake cam 45 between the ends of the brake shoes is rotated thereby expanding the brake shoes and applying them to the brake drum 51. In order that locking of the wheels will not take place the strength of the spring 58 is so adjusted that it will yield shortly before the ground resistance of the braked rear wheels becomes equal to the adhesion moment. The rear wheels will then be displaced rearwardly with respect to the vehicle frame 3 by an amount $d$, the ball socket 56 and its bearing 57 being simultaneously displaced by an equal amount $d$. By this means the angle lever 52, 54 will be rocked and will move into the position shown in broken lines, whereby the point of engagement 38 of the rod 37 is moved, for instance to the position 98 and the leverage of the lever 11 is reduced. By this means the pressure which the brake cam 45 exerts upon the brake shoes is reduced and consequently the braking moment also, so that locking of the wheels cannot take place.

In the constructional form shown in Figure 2, both the front and rear wheel brakes are operated by a pedal 4, which is rotatably mounted on a cross shaft 5, the pedal 4 being continued beyond the shaft 5 to form an arm 6 which is provided with a slot 7. In the slot 7 engages one end 9 of a rod 8 the other end 10 of which is pivoted to a cranked lever 14 which through the intermediary of levers 15 and 16 displaces the brake cam (not shown) which is arranged between the free ends of the brake shoes (also not shown). The rear wheel brakes are operated by the following mechanism: A rod 59 is connected up at one end to the cranked lever 14 at the point 159, the other end 60 of said rod 59 being connected up to a double armed rocking lever 61. The double armed lever 61 operates a rod 62 and a lever 63 which displaces the brake cam for applying the rear wheel brakes.

When the pedal 4 is depressed in the direction of the arrow the brakes of the front wheels and of the rear wheels will be applied simultaneously by the brake rigging. In order that locking of the wheels will not take place, the braked portions of the vehicle are connected to the frame 3 by means of a spring 30 which permits of displacement of the axles and the road wheels relatively to the frame in the direction of the arrow when the braking pressure approaches the limit at which locking of the wheels takes place. The spring 30 is housed in a spring casing 31 which is attached to the dumb iron 32 of the vehicle. The spring 30 bears at one end against the rear end of the spring casing 31 and at the other end against a plate 29 provided on the front end of the rod 28 the rear end of which is connected up to the spring shackle 27. A rod 26 is also connected at one end to the spring shackle 27 and at its other end is connected up to one arm 25 of an angle lever pivoted on a cross shaft 24, the other end 23 of the said angle lever engaging the rod 8. By the displacement of the axles and road wheels relatively to the frame, the angle lever 23, 25 is rocked by the rod 26 and in turn moves the rod 8 from the position shown in full lines to that shown in broken lines. By this means the engaging member 9 in the slot 7 is moved into the position 91 and the leverage of the brake pedal is reduced. In consequence of this the braking pressure and the braking moment of both the front and rear wheels will be reduced so that locking of the wheels cannot take place.

The constructional example shown in Figure 3 operates in a similar manner to the constructions shown in Figures 1 and 2, but in this case both the front and rear wheel brakes are operated in unison by a hand lever 11, means for preventing locking of the wheels being in this case connected up with the rear axle. The hand lever 11 is rotatably mounted on a shaft 34 and is prolonged beyond the said shaft to form an arm 35 which is provided with a slot 36 in which engages one end 72 of a rod 73 by means of which motion is transmitted to the brake cams (not shown) of the rear brakes through the intermediary of rigging 74, 75 and 76 for applying the brake shoes to the brake drums. The rod 73 is divided and is connected up to a double armed lever 77 which is pivoted on a pivot 78 on the frame of the vehicle. One end of the double armed lever 77 is connected up to a rod 79 which displaces the brake cams (also not shown) of the front wheel brakes through the intermediary of a lever 80 so as to apply the brake shoes to the brake drums of the front wheels. The rod 73 is engaged by one arm 52 of an angle lever which is fulcrumed on a pivot 53, the other arm 54 of said angle lever engaging between two stops 55 provided on the Cardan shaft casing 12. The ball socket 56 of the Cardan shaft casing universal joint is supported in a sliding bearing 57 which bears rearwardly against a spring 58.

When the hand lever 11 is pulled over in the direction of the arrow the brake shoes will be applied to the rear wheel brake drums in the same manner as those in the constructional form shown in Figure 1, while the brake shoes of the front wheel brakes will be applied to the front wheel brake drums by means of the double armed lever 77, the rod 79 and lever 80. Locking of the wheels is prevented because the spring 58, against which bears the bearing 57 of the ball socket 56 of the Cardan shaft casing universal joint, is put under such tension that it will always yield before the intensity of the braking pressure becomes sufficiently high to cause locking of the wheels. The means for preventing locking of the wheels employed in the constructional form shown in Figure 3 act in the same manner as the means for preventing locking of the rear wheels in the constructional form shown in Figure 1 and locking of the wheels can never take place.

By means of the invention the important advantage is obtained that the most effective action of the brakes (which are always most effective when the braking pressure approaches the limit at which locking of the wheels takes place) can be obtained independently of the skill of the driver by means of an automatic regulation of the pressure with which the brake shoes are applied to the brake drums and that locking of the wheels will always be prevented no matter what power may wilfully be expended by the driver in applying the brakes. The driver can therefore at all times actuate the brakes without having to exercise any care since the danger of locking of the wheels, which increases in the course of the slowing down of the vehicle, is avoided.

By means of the invention therefore an important improvement is effected in the construction of power driven vehicles, particularly in the case of vehicles provided with front wheel brakes, because it is in the main owing to locking of the front wheels that the proper steering of the vehicle is interferred with.

The constructional example shown in Figure 2 utilizes the relative motion between the front axle and the vehicle frame. In Figure 3 use is made of relative motion between the back wheel axle and the vehicle frame.

What I claim, is:

1. In a power driven vehicle, the combination with brakes for the road wheels of the vehicle, of means responsive upon relative longitudinal movement between the wheels and the vehicle for automatically relieving the braking pressure on said road wheels.

2. In a power driven vehicle, the combination with a brake for a road wheel of the vehicle, of means responsive upon relative longitudinal movement between the wheels and the vehicle for acting on the brake of said road wheel for automatically relieving the braking pressure on the wheel.

3. In a power driven vehicle, the combination with brakes for the road wheels of the vehicle, of means responsive upon relative longitudinal movement between the wheels and the vehicle for acting on the brakes of both wheels of one axle in unison for automatically relieving the braking pressure on said road wheels.

4. In a power driven vehicle, the combination with brakes for the road wheels of the vehicle of means responsive upon relative longitudinal movement between the wheels and the vehicle for acting on the brakes of all the road wheels in unison for automatically relieving the braking pressure on said road wheels.

5. In a power driven vehicle, the combination of non-braked elements including the vehicle frame, braked elements including the road wheels, means for connecting said non-braked elements to said braked elements so as to permit displacement of the latter with respect to the former and means responsive upon relative longitudinal movement between the wheels and the vehicle for relieving the braking pressure on the wheels.

6. In a power driven vehicle, the combination of non-braked elements including the vehicle frame, braked elements including the road wheels, means for connecting said non-braked elements to said braked elements so as to permit displacement of the latter with respect to the former and means intended to co-operate with the non-braked elements and the braked elements so as to be actuable by said displacement for limiting the braking pressure.

7. In a power driven vehicle, the combination of non-braked elements including the vehicle frame, braked elements including the road wheels, means for connecting said non-braked elements to said braked elements so as to permit displacement of the latter with respect to the former, means for opposing a yielding resistance to the displacement of the braked elements with respect to the non-braked elements and means intended to co-operate with the non-braked elements and the braked elements so as to be actuable by said displacement for limiting the braking pressure.

8. In a power driven vehicle, the combination of non-braked elements including the vehicle frame, braked elements including the road wheels, means for connecting said non-braked elements to said braked elements so as to permit displacement of the latter with respect to the former, means for opposing a yielding resistance to the displacement of the braked elements with respect to the non-braked elements, means for varying the magnitude of said means for opposing a yielding resistance, and means intended to co-operate with the non-braked elements and the braked elements so as to be actuable by said displacement for limiting the braking pressure.

9. In a power driven vehicle, the combination of non-braked elements including the vehicle frame, braked elements, including the road wheels, means for connecting said non-braked elements to said braked elements so as to permit displacement of the latter with respect to the former, adjustable means for opposing a yielding resistance to the displacement of the braked elements with respect to the non-braked elements and means intended to co-operate with the non-braked elements and the braked elements so as to be actuable by said displacement for reducing the leverage of the brake rigging and thereby lowering the braking pressure.

10. In a power driven vehicle, the combination of non-braked elements including the vehicle frame, braked elements including the road wheels, means for connecting said non-braked elements to said braked elements so as to permit displacement of the latter with respect to the former, adjustable means for opposing a yielding resistance to the displacement of the braked elements with respect to the non-braked elements, a brake lever operable by the driver for applying the brakes to the road wheels and means intended to co-operate with the non-braked and the braked elements so as to be actuable by said displacement for shifting the point of application of the brake lever to the brake rigging and thereby reducing the braking pressure.

11. In a power driven vehicle, the combination of non-braked elements including the vehicle frame, braked elements including the road wheels, means for connecting said non-braked elements to said braked elements so as to permit displacement of the latter with respect to the former, a member operable by the driver for applying the brakes to the road wheels, a brake rod interposed between said brake applying member and the brakes, said brake rod having a variable point of application, and a second rod for varying the point of application of the brake rod connected to the means for opposing a yielding resistance to relative displacement of the braked and non-braked elements of the vehicle.

In witness whereof I have hereunto signed my name.

FERDINAND PORSCHE.